(12) United States Patent
Gorshkov et al.

(10) Patent No.: US 7,541,016 B2
(45) Date of Patent: Jun. 2, 2009

(54) LITHIUM TITANATE AND METHOD OF FORMING THE SAME

(75) Inventors: Vadim Gorshkov, Ekaterinburg (RU); Oleg Volkov, Fishers, IN (US)

(73) Assignee: EnerDel, Inc., Indianapolis, IN (US)

( * ) Notice: Subject to any disclaimer, the term of this patent is extended or adjusted under 35 U.S.C. 154(b) by 334 days.

(21) Appl. No.: 11/462,520

(22) Filed: Aug. 4, 2006

(65) Prior Publication Data

US 2007/0238023 A1 Oct. 11, 2007

Related U.S. Application Data

(60) Provisional application No. 60/744,635, filed on Apr. 11, 2006.

(51) Int. Cl.
*C01D 15/00* (2006.01)
*C01G 23/00* (2006.01)
*C01G 57/00* (2006.01)
*H01M 4/00* (2006.01)
*H01M 4/02* (2006.01)
*H01M 4/40* (2006.01)
*H01M 4/58* (2006.01)

(52) U.S. Cl. ............... 423/598; 423/69; 423/71; 429/27; 429/40; 429/209; 429/231.1; 429/231.5; 429/234.95; 180/313

(58) Field of Classification Search ............ 429/27, 429/40, 209, 231.1, 231.5, 231.95; 423/69, 423/71, 598; 180/313
See application file for complete search history.

(56) References Cited

U.S. PATENT DOCUMENTS 5,545,468 A 8/1996 Koshiba et al.
6,022,640 A * 2/2000 Takada et al. .......... 429/231.95
6,139,815 A 10/2000 Atsumi et al.
6,221,531 B1 4/2001 Vaughey et al.
6,645,673 B2 11/2003 Yamawaki et al.
6,890,510 B2 5/2005 Spitler et al.
6,916,579 B2 7/2005 Gorchkov et al.
2001/0031401 A1 10/2001 Yamawaki et al.
2002/0197532 A1 12/2002 Thackeray et al.

OTHER PUBLICATIONS

International Search Report PCT/US 2007/08753; received from Patent Cooperation Treaty Apr. 4, 2008; 10 pages.
U. Roy et al., Preparation and Superconducting Properties of Lithium Titanate, IEEE Transactions on Magnetics, vol. MAG-13, No. 1, Jan. 1977, pp. 836-839.

(Continued)

*Primary Examiner*—Timothy C Vanoy
*Assistant Examiner*—Serena L Hanor

(57) ABSTRACT

A lithium titanate has the following formula:

$$Li_4Ti_5O_{12-x}$$

wherein x is greater than 0. The lithium titanate is formed by providing a mixture of titanium dioxide and a lithium-based component. The mixture is sintered in a gaseous atmosphere comprising a reducing agent to form the lithium titanate having the above formula. A lithium-based cell includes an electrolyte, an anode, and a cathode, with at least one of the anode and the cathode comprising the lithium titanate having the above formula. The lithium titanate is deficient of oxygen, which increases electronic conductivity of the lithium titanate by at least three orders over electronic conductivity of a stoichiometric lithium titanate, while avoiding loss of reversible electric power-generating capacity that typically occurs when doping is used to replace titanium in the lithium titanate with atoms that provide higher electronic conductivity.

21 Claims, 13 Drawing Sheets

OTHER PUBLICATIONS

Colbow et al., "Structure And Electrochemistry of the Spinel Oxides $LiTi_2O_4$ and $Li4/3Ti5/3O_4$", Journal of Power Sources, 26, 1989, pp. 397-402.

Deschanvres et al., "Mise En Evidence Et Etude Cristallographique D'Une Nouvelle Solution Solide De Type Spinelle $Li1+xTi2-xO4$ $0\backslash< x\backslash<0,333$", Mat. Res. Bull., vol. 6, 1971, pp. 699-704.

Kubiak et al., "Phase Transistion In The Spinel $Li_4Ti_5O_{12}$ Induced By Lithium Insertion Influence Of The Substitutions Ti/V, Ti/Mn, Ti/Fe", Journal of Power Sources, V. 119-121, 2003, pp. 626-630.

Nakayama et al., "Mixed Conduction For The Spinel Type $(1-x)Li4/3Ti5/3O4-xLiCrTiO4$ System", Solid State Ionics, V. 117, 1999, pp. 265-271.

Ohzuku et al., "Zero-Strain Insertion Material of $Li[Li1/3Ti5/3]O4$ for Rechargeable Lithium Cells", J. of Electrochemical Society, V. 142, No. 5, 1995, pp. 1431-1435.

Scharner et al., "Evidence of Two-Phase Formation Upon Lithium Insertion Into The $Li1.33Ti1.67O4$ Spinel", Journal of The Electrochemical Society, V. 146, No. 3, 1999, pp. 857-861.

* cited by examiner

LITHIUM TITANATE AND METHOD OF FORMING THE SAME

RELATED APPLICATIONS

This patent application claims priority to and all advantages of U.S. Provisional Patent Application No. 60/744,635 filed Apr. 11, 2006.

BACKGROUND OF THE INVENTION

1. Field of the Invention

The present invention generally relates to a lithium titanate and a method of forming the lithium titanate. More specifically, the present invention relates to a lithium titanate that has excellent electronic conductivity and excellent electric power-generating capacity.

2. Description of the Related Art

Motor vehicles such as, for example, hybrid vehicles use multiple propulsion systems to provide motive power. The most common hybrid vehicles are gasoline-electric hybrid vehicles, which include both an internal-combustion engine (ICE) and an electric motor. The gasoline-electric hybrid vehicles use gasoline to power the ICE, and an electric battery to power the electric motor. The gasoline-electric hybrid vehicles recharge their batteries by capturing kinetic energy. The kinetic energy may be provided via regenerative braking or, when cruising or idling, from the output of the ICE. This contrasts with pure electric vehicles, which use batteries charged by an external source such as a power grid or a range extending trailer.

The batteries include rechargeable lithium-based cells that typically comprise two dissimilar electrodes, i.e., an anode and a cathode, that are immersed in an ion conducting electrolyte, with a separator positioned between the two electrodes. Electrical energy is produced in the cells by an electrochemical reaction that occurs between the two dissimilar electrodes.

The largest demand placed on the battery occurs when it must supply current to operate the electric motor during acceleration, especially during start-up of the electric motor. The amperage requirements of the electric motor may be over several hundred amps. Most types of batteries that are capable of supplying the necessary amperage have a large volume or require bulky packaging, which results in excessive weight of the batteries and adds cost to the batteries. At the same time, such high currents are only required for short periods of time, usually seconds. Therefore, so called "high-rate" batteries, which provide high currents for short periods of time, are typically ideal for hybrid and pure electric vehicle applications.

Rechargeable batteries that include rechargeable lithium-based cells, which may be characterized as either lithium cells, lithium ion cells, or lithium polymer cells, combine high electric power-generating capacity with the potential for power and cycle-life needed to enable the hybrid vehicles to meet performance standards while remaining economical. By "high electric power-generating capacity", it is meant that the rechargeable batteries have four times the energy density of lead-acid batteries and two to three times the energy density of nickel-cadmium and nickel-metal hydride batteries. Rechargeable batteries including the lithium-based cells also have the potential to be one of the lowest-cost battery systems.

Lithium titanate represented by the formula $Li_4Ti_5O_{12}$ (or $Li_{4/3}Ti_{5/3}O_4$) is considered to be one of the most prospective materials for use in the anodes of rechargeable lithium ion and lithium polymer cells. Lithium titanate, $Li_4Ti_5O_{12}$, is known from A. Deschanvers et al. (Mater. Res. Bull., v. 6, 1971, p. 699). As it was later published by K. M. Colbow et al. (J. of Power Sources, v. 26, N. 3/4, May 16, 1989, pp. 397-402), $Li_4Ti_5O_{12}$ is able to act in a reversible electrochemical reaction, while elemental lithium is incapable of such reversible reactions. After detailed research conducted by T. Ozhuku et al. (J. of Electrochemical Society, v. 142, N. 5, 1995, pp. 1431-1435) the $Li_4Ti_5O_{12}$ started to become considered for use as an anode material for rocking-chair type lithium cells. In fact, U.S. Pat. No. 5,545,468 to Koshiba et al. discloses the use of a lithium titanate having varying ratios of lithium to titanium in the lithium titanate. More specifically, the lithium titanate of the '468 patent is of the formula $Li_xTi_yO_4$, wherein $0.8 \leq x \leq 1.4$ and $1.6 \leq y \leq 2.2$, in a cathode for a lithium cell. The '468 patent specifies that fundamentally, $x+y \approx 3$. In other words, the '468 patent teaches that the lithium titanate may include different ratios of lithium to titanium, so long as the amount of lithium and titanium together about 3 such that there is a stoichiometric amount of lithium and titanium to oxygen. United States Patent Publication No. 2002/0197532 to Thackeray et al. also discloses a lithium titanate that is used as an anode in a lithium cell. The lithium titanate may be a stoichiometric or defect spinel, in which the distribution of lithium can vary from compound to compound.

In addition to an ability to act in the reversible electrochemical reaction, $Li_4Ti_5O_{12}$ also has other advantages that make it useful in rechargeable lithium-based cells. For example, due to a unique low volume change of the lithium titanate during the charge and discharge processes, the lithium titanate has excellent cycleability, i.e., many cycles of charging and discharging may occur without deterioration of the cells. The excellent cycleability of the lithium titanate is primarily due to a cubic spinel structure of $Li_4Ti_5O_{12}$. According to data of S. Scharner et al. (J. of Electrochemical Society, v. 146, N. 3, 1999, pp. 857-861) a lattice parameter of the cubic spinel structure (cubic, Sp. gr. Fd-3m (227)) varies from 8.3595 to 8.3538 Å for extreme states during charging and discharging. This linear parameter change is equal to a volume change of about 0.2%. $Li_4Ti_5O_{12}$ has an electrochemical potential versus elemental lithium of about 1.55 V and can be intercalated with lithium to produce an intercalated lithium titanate represented by the formula $Li_7Ti_5O_{12}$, which has a theoretical electric power-generating capacity of up to and including 175 mA*hrs/g.

Another advantage of $Li_4Ti_5O_{12}$ is that it has a flat discharge curve. More specifically, the charge and discharge processes of $Li_4Ti_5O_{12}$ take place in a two-phase system. $Li_4Ti_5O_{12}$ has a spinel structure and, during charging, transforms into $Li_7Ti_5O_{12}$, which has an ordered rock-salt type structure. As a result, electric potential during the charge and discharge processes is determined by electrochemical equilibrium of the $Li_4Ti_5O_{12}/Li_7Ti_5O_{12}$ pair, and is not dependant on lithium concentration. This is in contrast to the discharge curve of most other electrode materials for lithium power sources, which maintain their structure during the charge and discharge processes. For example, although a transition of a charged phase in most cathode materials such as $LiCoO_2$ is pre-determined, there is still an extended limit of variable composition $Li_xCoO_2$ between these structures. As a result, electrical potential of materials such as $LiCoO_2$ depends on a lithium concentration in the $LiCoO_2$, i.e., a state of charge or discharge. Thus, a discharge curve in materials in which the electrical potential is dependent on the lithium concentration in the material is typically inclined and is often a step-like curve.

There is a general consensus within the art that maintenance of excellent electric power-generating capacity correlates to excellent electronic conductivity. $Li_4Ti_5O_{12}$ includes titanium in a highest oxidation degree of +4, which correlates to very low electronic conductivity. An electronic conductivity of similar compounds is so low that many of those compounds are borderline dielectrics or insulators. As such, power generating capacity of $Li_4Ti_5O_{12}$ is less than ideal. The same holds true for the lithium titanates of the '468 patent and the '532 publication, as set forth above.

Typically, electronic conductivity of the $Li_4Ti_5O_{12}$ is improved by doping the $Li_4Ti_5O_{12}$ with 3d-elements, as disclosed by M. Nakayama et al (Solid State Ionics, v. 117, I. 3-4, 2 Feb. 1999, pp. 265-271). For example, electronic conductivity of $Li[Li_{(1-x)/3}Cr_xTi_{(5-2x)/3}]O_4$, which is considered to be a solid solution between $Li_4Ti_5O_{12}$ and $LiCrTiO_4$, is better than electronic conductivity of the $Li_4Ti_5O_{12}$. However, an increase in the amount of Cr ions substituted for titanium ions in the $Li_4Ti_5O_{12}$ also decreases reversible electric power-generating capacity, as compared to $Li_4Ti_5O_{12}$, due to electrochemical inactivity attributable to the presence of the Cr ions. The presence of the Cr ions lowers area specific impedance (ASI) and increases rate capability, as compared to ASI and rate capability of $Li_4Ti_5O_{12}$. The loss in capacity is substantially equal to the share of replaced titanium.

Other attempts to replace the titanium in lithium titanates exhibit similar drawbacks. For example, substitution of titanium in $Li_4Ti_5O_{12}$ with vanadium, manganese, and iron results in significant loss of reversible electric power-generating capacity during a first charge-discharge cycle. See P. Kubiak, A. Garsia, M. Womes, L. Aldon, J. Olivier-Fourcade, P.-E. Lippens, J.-C. Jumas "Phase transition in the spinel $Li_4Ti_5O_{12}$ induced by lithium insertion. Influence of the substitution Ti/V, Ti/Mn, Ti/Fe" (J. of Power Sources, v. 119-121, Jun. 1, 2003, pp. 626-630).

In view of the foregoing, there remains an opportunity to provide a lithium titanate that is modified to exhibit excellent electronic conductivity while maintaining reversible electric power-generating capacity that is characteristic of lithium titanate. There is also an opportunity to provide a lithium-based cell that includes the lithium titanate.

SUMMARY OF THE INVENTION AND ADVANTAGES

The subject invention provides a lithium titanate having the following formula:

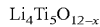

$$Li_4Ti_5O_{12-x}$$

wherein x is greater than 0. The subject invention further provides a method of forming the lithium titanate. The method includes the step of providing a mixture of titanium dioxide and a lithium-based component. The mixture is sintered in a gaseous atmosphere comprising a reducing agent to form the lithium titanate having the above formula. The subject invention further comprises a lithium-based cell including an electrolyte, an anode, and a cathode. At least one of the anode and the cathode comprises lithium titanate having the above formula.

The lithium titanate, as indicated in the above formula, is deficient of oxygen, which increases electronic conductivity of the lithium titanate by typically two orders over electronic conductivity of a stoichiometric lithium titanate, while avoiding loss of reversible electric power-generating capacity that typically occurs when doping is used to replace titanium in the lithium titanate with atoms that provide higher electronic conductivity. As such, the lithium titanate of the present invention is suitable for lithium-based cells that are used in rechargeable batteries that are a power source for electric motors in gasoline-electric hybrid vehicles, and the lithium titanate of the present invention materially contributes to the conservation of energy resources by improving performance of the lithium-based cells.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

A lithium titanate of the present invention is useful in lithium-based cells. The lithium-based cells including the lithium titanate of the present invention are useful in many applications, but are particularly useful in rechargeable batteries for vehicles 10, such as hybrid or electric vehicles 10; however, it is to be appreciated that the lithium-based cells may be used in non-rechargeable batteries. The rechargeable batteries are a power source for an electric motor of the vehicles 10.

The lithium-based cells include an electrolyte, an anode, and a cathode. Electrolytes for the lithium-based cells are typically non-aqueous lithium ion-conducting electrolytes and are known in the art. At least one of the anode and the cathode includes the lithium titanate of the present invention. For example, the lithium-based cell may be further defined as a lithium cell, wherein the cathode comprises the lithium titanate of the present invention. The lithium titanate is typically present in the cathode in an amount of at least 80 parts by weight, more typically from 80 to 90 parts by weight, most typically in an amount of about 82 parts by weight based on the total weight of the cathode. In addition to the lithium titanate, the cathode in the lithium cell also typically includes a conductive agent such as carbon black along with a binder agent, such as polyvinylidene fluoride, which make up the balance of the cathode. More specifically, the carbon black is typically present in an amount of from 8 to 10 parts by weight, more typically about 8 parts by weight based on the total weight of the cathode, and the binder agent is typically present in an amount of from 8 to 12 parts by weight, more typically about 10 parts by weight, based on the total weight of the cathode. The anode in the lithium cells is typically a lithium metal or lithium alloy with magnesium or aluminum.

Alternatively, the lithium-based cell may be further defined as one of a lithium ion cell and a lithium polymer cell, wherein the anode comprises the lithium titanate of the present invention in the amounts set forth above.

Figure 1:
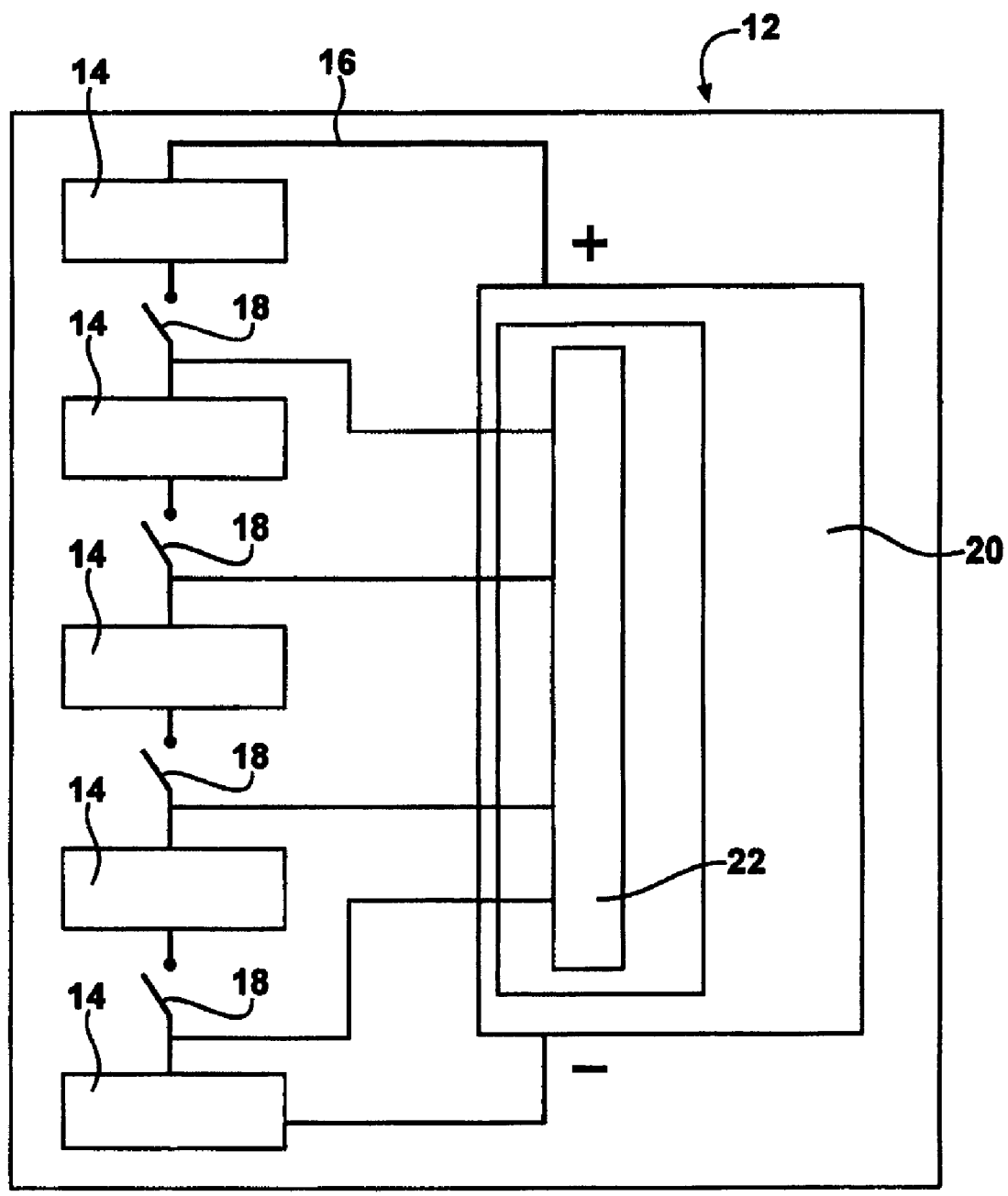
FIG. 1 is a schematic view of a rechargeable battery including lithium-based cells.
Figure 2:
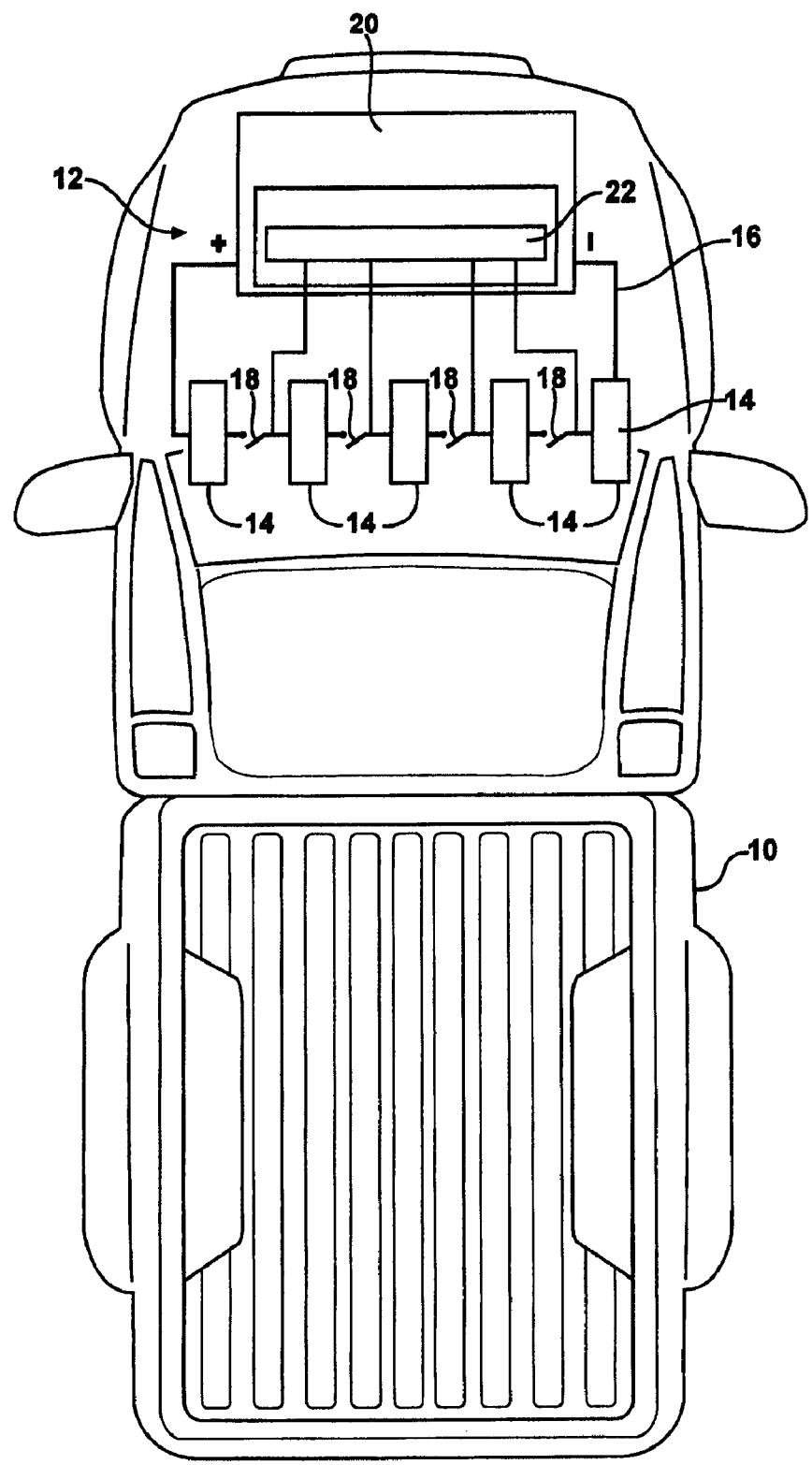
FIG. 2 is a schematic view of a vehicle including the rechargeable battery of FIG. 2.

When used in rechargeable batteries for hybrid or electric vehicles 10, the cells are typically used in a battery pack, represented by 14 in FIGS. 1 and 2. The battery packs 14 typically include four rows of the cells that are interconnected and extend along each row in overlapping relationship. Each row typically includes five stacks of the cells. However, it is to be appreciated that other configurations of the cells within the battery pack 14 may also be used.

As known in the art, the rechargeable batteries typically include a plurality of the battery packs 14 connected in a circuit in order to provide sufficient energy for powering the vehicle 10. As shown in FIGS. 1 and 2, the circuit is configured with switches 18 and a battery management system 20 disposed in the circuit 16. The battery management system 20 includes a switch control and interface circuit 22 to control energy usage from and recharge of the cells in the battery packs 14.

The lithium titanate of the present invention has the following formula:

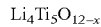

wherein x is greater than 0. Typically, 0<x<0.02. In other words, the lithium titanate of the present invention is deficient of oxygen, which has excellent electronic conductivity, as compared to lithium titanate of the above formula that is not deficient of oxygen. At the same time, concentration of lithium in the lithium titanate of the present invention remains the same as for lithium titanate that is not deficient of oxygen. As a result, expected reversible electric power-generating capacity of the lithium titanate of the present invention will remain the same as the reversible electric power-generating capacity of lithium titanate that includes a stoichiometric amount of oxygen.

Figure 3:
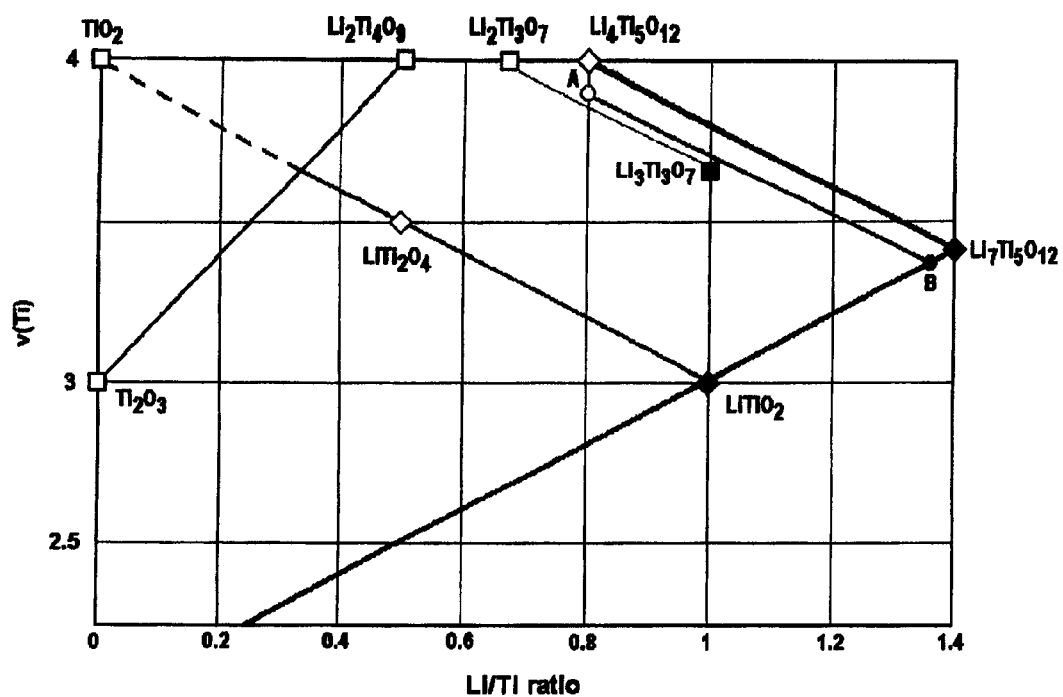
FIG. 3 is a lithium titanate composition-valence diagram showing a relationship between ratios of lithium to titanium in lithium titanate to a valence of titanium in the lithium titanate, with diamonds indicating spinel structures, squares indicating non-spinel structures, with filled symbols indicating lithium titanates that include intercalated lithium ions.

The effect on electronic conductivity as a result of the oxygen deficiency is attributable to changes in an oxidation state, i.e., valence, of the titanium in the lithium titanate. More specifically, lithium titanates that include titanium atoms in a +3 oxidation state exhibit high electronic conductivity that is characteristic of metal-like material, while lithium titanates that include titanium atoms in a +4 oxidation state exhibit low electronic conductivity that is characteristic of a dielectric material. Referring to FIG. 3, the oxidation state of various lithium titanates is represented on the vertical axis as v(Ti), i.e., valence of titanium. As such, FIG. 3 indicates the relative electronic conductivity of the various lithium titanates, at various states of intercalation, with higher v(Ti) correlating to lower electronic conductivity. $Li_4Ti_5O_{12}$ is an example of lithium titanate having the titanium atoms in the +4 oxidation state.

During electrochemical intercalation or charging of conventional $Li_4Ti_5O_{12}$, phase transition from spinel to "rock salt"-type occurs wherein three lithium atoms are intercalated into the conventional $Li_4Ti_5O_{12}$ to produce $Li_7Ti_5O_{12}$. $Li_7Ti_5O_{12}$ has a higher electronic conductivity than the conventional $Li_4Ti_5O_{12}$ due to the transformation of titanium atoms in the conventional $Li_4Ti_5O_{12}$ from the +4 oxidation state to the +3 oxidation state during intercalation, as shown in FIG. 3 and as represented by the following equation:

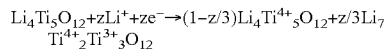

wherein z represents the number of lithium atoms that are intercalated into the $Li_4Ti_5O_{12}$. As such, the conventional $Li_4Ti_5O_{12}$ exhibits variable electronic conductivity based on the state of intercalation and zones of low and high electronic conductivity may exist during intercalation and discharge due to the disparate differences in electronic conductivity between the conventional $Li_4Ti_5O_{12}$ and $Li_7Ti_5O_{12}$. Poor electronic conductivity of the conventional $Li_4Ti_5O_{12}$ causes initial "training" of the cells by low current as well as prevention of a complete charge. These circumstances extremely limit opportunities of use of the conventional $Li_4Ti_5O_{12}$ for high rate applications.

In accordance with the present invention, it was surprisingly found that the following relationship exists:

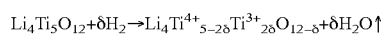

In effect, reduction of $Li_4Ti_5O_{12}$ to form the $Li_4Ti_5O_{12-x}$ results in the transformation of titanium atoms in the $Li_4Ti_5O_{12}$ from the +4 oxidation state to the +3 oxidation state as a result of charge compensation, thereby exhibiting increased electronic conductivity of the $Li_4Ti_5O_{12-x}$ while retaining the same number of lithium and titanium atoms in the lithium titanate. Stated differently, an average valence of titanium in the lithium titanate of the present invention is less than 4. The practical result of the above finding is that the lithium titanate will exhibit less drastic changes in electronic conductivity at all stages of charge and discharge processes, as opposed to the conventional $Li_4Ti_5O_{12}$ that exhibits electronic conductivity that is near that of dielectric materials prior to charging, such that different zones of $Li_4Ti_5O_{12-x}$ and $Li_7Ti_5O_{12-x}$ will exhibit more uniform media for charge and discharge processes, as compared to conventional $Li_4Ti_5O_{12}$, which is advantageous for high-rate applications.

Since the same numbers of electrochemically active lithium and titanium atoms are present as are present in the $Li_4Ti_5O_{12}$, expected reversible electric power-generating capacity will be the same for the $Li_4Ti_5O_{12-x}$ as for the $Li_4Ti_5O_{12}$. The $Li_4Ti_5O_{12-x}$ also retains the same spinel structure as $Li_4Ti_5O_{12}$, which has excellent cycleability. As set forth above, typically, 0<x<0.02 in order to maintain the lithium titanate having the same spinel structure as the $Li_4Ti_5O_{12}$. More specifically, referring to FIG. 3, the lithium titanate of the present invention, by having the oxygen deficiency, shifts the $Li_4Ti_5O_{12-x}$ to a position represented by "A" in FIG. 3 due to the transformation of titanium atoms in the $Li_4Ti_5O_{12}$ from the +4 oxidation state to the +3 oxidation state, with the position represented by "B" indicating an intercalation state of the $Li_4Ti_5O_{12-x}$. The value of x, in order to maintain the same spinel structure as Li4Ti5O12, is limited since lithium titanate with structure of Li2Ti3O7 will form if the amount of titanium in the +3 oxidation state becomes too high. $Li_2Ti_3O_7$ has an orthorhombic crystal structure with space group Pbnm (62). Although $Li_2Ti_3O_7$ may be suitable for certain applications, the spinel structure of $Li_4Ti_5O_{12}$ is preferred due to the ability to intercalate more lithium into the structure than can be intercalated into the $Li_2Ti_3O_7$ and also due to the fact that $Li_4Ti_5O_{12}$ exhibits low volume change of from 8.3595 to 8.3538 Å between intercalated and deintercalated states, which provides the excellent cycleability.

A method of forming the $Li_4Ti_5O_{12-x}$ includes the step of providing a mixture of titanium dioxide and a lithium-based component. Titanium dioxide can be used both in the form of rutile and in the form of anatase, as well as any form of titanium oxide-hydroxide (such as $Ti(OH)_{2x}O_{2-x}$). Any lithium-based component that is typically used for forming $Li_4Ti_5O_{12}$ may be used. Typically, the lithium-based component is selected from the group of lithium carbonate, lithium hydroxide, lithium oxide, and combinations thereof, and the lithium-based component is typically at least 99% pure. Lithium salts or organic acids can also be used. Typically, the lithium-based component and titanium oxide are present in the mixture in amounts necessary to ensure an atomic ratio Li/Ti=0.8 in the final lithium titanate of the present invention.

The mixture including the titanium dioxide and the lithium-based component is sintered in a gaseous atmosphere comprising a reducing agent to form the lithium titanate. More specifically, the mixture is sintered at a temperature of at least 450° C., more typically from about 500 to 925° C., most typically from about 700 to about 920° C., for a period of at least 30 minutes, more typically from 60 to about 180 minutes.

The reducing agent may be any agent that is capable of reducing the oxygen in the $Li_4Ti_5O_{12}$ and is typically selected from the group of hydrogen, a hydrocarbon, carbon monoxide and combinations thereof. The reducing agent is typically present in the gaseous atmosphere in a concentration of at least 0.1% by volume, more typically from about 1 to about 100% by volume, in order to sufficiently reduce the $Li_4Ti_5O_{12}$ to form the $Li_4Ti_5O_{12-x}$.

In addition to the reducing agent, the gaseous atmosphere typically includes another gas selected from the group of an inert, an inactive gas, and combinations thereof. Any inert gas may be used, such as any noble gas, in order to prevent unwanted side reactions during sintering and in order to prevent introduction of impurities into the $Li_4Ti_5O_{12-x}$. Inactive gas that may be used is, for example, pure nitrogen.

The following examples are meant to illustrate the present invention and are not to be view in any way as limiting to the scope of the invention.

EXAMPLES

Lithium titanate of the present invention having the formula $Li_4Ti_5O_{12-x}$ is formed according to the method of the invention as set forth above. More specifically, conventional $Li_4Ti_5O_{12}$ is first formed by forming a mixture including titanium dioxide and a lithium-based compound. The mixture is formed by introducing the titanium dioxide and the lithium-based compound into a vessel in the amounts shown in Table 1. The titanium dioxide and the lithium-based compound are mixed and milled in a ball mill for a period of about 60 minutes at least 150 rpm rotation speed using a particle size distribution measurement till particle size less than 5 mkm, more preferably less than 2 mkm, with unimodal distribution to ensure sufficient mixing of the titanium dioxide and the lithium-based component. The mixture is then sintered in a gaseous atmosphere, created by a gas or gas mixture with constant flow at temperatures and times as indicated in Table 1. The gas or gas mixture includes a reducing agent and an inert gas or inactive gas in the amounts indicated in Table 1. The resulting lithium titanate has the formula $Li_4Ti_5O_{12-x}$ with 0<x<0.02. Relevant properties of the lithium titanate of the present invention are also included in Table 1 below.

TABLE 1

| | Component | Example 1 | Example 2 | Example 3 |
|---|---|---|---|---|
| Mixture | Titanium Dioxide, pbw based on total weight of mixture | 72.992 | 80.655 | 76.632 |
| | Lithium-based Component A, pbw based on total weight of mixture | 27.008 | — | 14.178 |
| | Lithium-based Component B, pbw based on total weight of mixture | — | 19.345 | 9.190 |
| | Total | 100.0 | 100.0 | 100.0 |
| Gaseous Atmosphere | Reducing Agent A flow, L/(min · kg) based on total weight of mixture | 0.002 | — | — |
| | Reducing Agent B flow, L/(min · kg) based on total weight of mixture | — | 0.0025 | — |
| | Reducing Agent C flow, L/(min · kg) based on total weight of mixture | — | — | 0.05 |

TABLE 1-continued

| Component | Example 1 | Example 2 | Example 3 |
|---|---|---|---|
| Inert Gas A flow, L/(min · kg) based on total weight of mixture | 0.048 | 0.0225 | — |
| Inactive Gas B flow, L/(min · kg) based on total weight of mixture | — | — | 0.095 |
| Total | 0.05 | 0.025 | 0.1 |
| Sintering Time, min | 120 | 100 | 180 |
| Sintering Temperature, °C. | 850 | 900 | 800 |
| X value in $Li_4Ti_5O_{12-x}$ | 0.009 ± 0.001 | 0.015 ± 0.001 | 0.005 ± 0.001 |
| Reversible Electric Power-Generating Capacity, mA * hrs/g | 168 | 170 | 160 |
| Crystal Structure Parameter (a), Å, at 300 K | 8.36012 | 8.35978 | 8.36023 |
| Logarithm of DC Electronic Conductivity, (S cm$^{-1}$), at 300 K | −5.2 | −4.7 | −5.9 |

Lithium-based Component A is $Li_2CO_3$.
Lithium-based Component B is LiOH.
Reducing Agent A is $H_2$.
Reducing Agent B is $CH_4$ (methane).
Reducing Agent C is CO (carbon monoxide).
Inert Gas A is Argon.
Inactive Gas B is $N_2$ (nitrogen).

Comparative Example

Conventional lithium titanate having the formula $Li_4Ti_5O_{12}$ is formed in the same manner as set forth above; however the reducing agent is not present in the gaseous atmosphere. The amounts of the components used to form the conventional lithium titanate are shown below in Table 2, along with relevant properties of the conventional lithium titanate.

TABLE 2

| | Component | Comp. Example 1 | Comp. Example 2 |
|---|---|---|---|
| Mixture | Titanium Dioxide, pbw based on total weight of mixture | 72.992 | 80.655 |
| | Lithium-based Component A, pbw based on total weight of mixture | 27.008 | — |
| | Lithium-based Component B, pbw based on total weight of mixture | — | 19.345 |
| | Total | 100.0 | 100.0 |
| Gaseous Atmosphere | Inert Gas A flow, L/(min · kg) based on total weight of mixture | 0.1 | — |
| | Inactive Gas B flow, L/(min · kg) based on total weight of mixture | — | 0.2 |
| | Total | 0.1 | 0.2 |
| | Sintering Time, min | 180 | 120 |
| | Sintering Temperature, °C. | 850 | 900 |
| | X value in $Li_4Ti_5O_{12-x}$ formula | 0 ± 0.0005 | 0 ± 0.0005 |
| | Reversible Electric Power-Generating Capacity, mA * hrs/g | 145 | 150 |
| | Crystal Structure Parameter (a), Å, at 300 K | 8.36055 | 8.35915 |
| | Logarithm of DC Electronic Conductivity, (S cm$^{-1}$), at 300 K | <−9 | ~−9 |

Results

With reference to the reversible electric power-generating capacity and the electronic conductivity of the Examples and the Comparative Example, it is apparent that the lithium titanates of the present invention exhibit higher electronic conductivity than conventional lithium titanates of the Comparative Examples, while exhibiting even higher reversible electric power-generating capacity.

Figure 4:
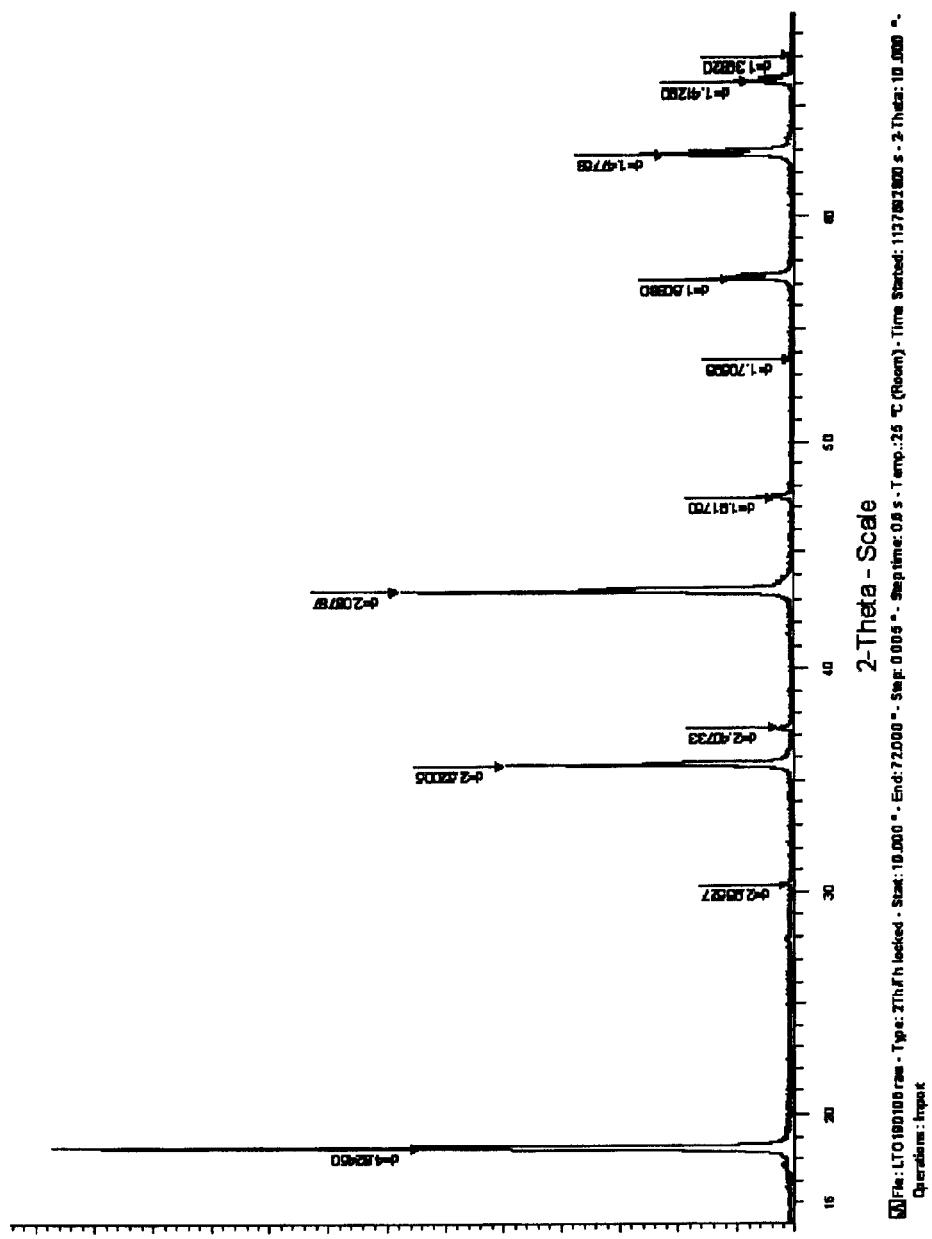
FIG. 4 is an X-ray diffraction spectra for conventional $Li_4Ti_5O_{12}$ of the prior art, synthesized according to Comp. Example 1 in Table 2.
Figure 5:
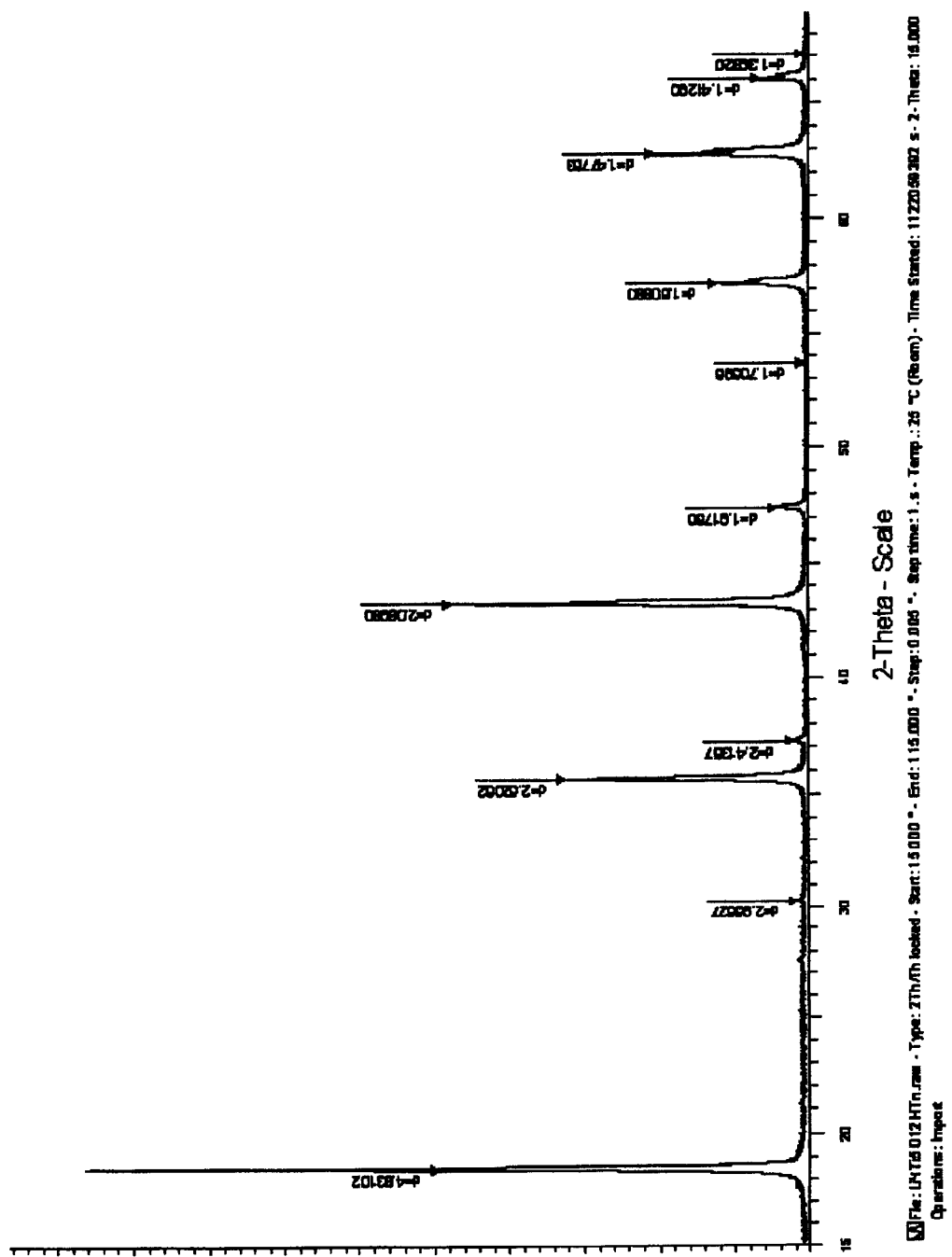
FIG. 5 is an X-ray diffraction spectra for $Li_4Ti_5O_{11.985}$ of the present invention, synthesized according to Example 2 in Table 1.

Specifically, XRD spectra are received on an x-ray diffractometer Bruker D4 on $CuK_\alpha$ radiation with Sol-X detector. All samples listed in Table 1 and 2 give well-defined spectra correspond to cubic structure (Sp. gr. Fd-3m (227)). Small amounts of residual $TiO_2$ (<0.5%) are present in most of samples. Using a full-profile analysis method, with conventional structure model (see for example, S. Scharner, W. Wepner, P. Schmid-Beurmann. Evidence of Two-Phase Formation upon Lithium insertion into the $Li_{1.33}Ti_{1.67}O_4$ Spinel, Journal of the Electrochemical Society. v. 146, I. 3, pp. 857-861, 1999), parameter (a) of a cubic crystal lattice is calculated, and is shown in the Tables 1 and 2. Two typical spectra, one for $Li_4Ti_5O_{12}$ of the prior art represented by Comp. Examples 1 and 2, and one for $Li_4Ti_5O_{11.985}$ of the present invention represented by Example 2, are presented on FIGS. 4 and 5, respectively.

Figure 6:
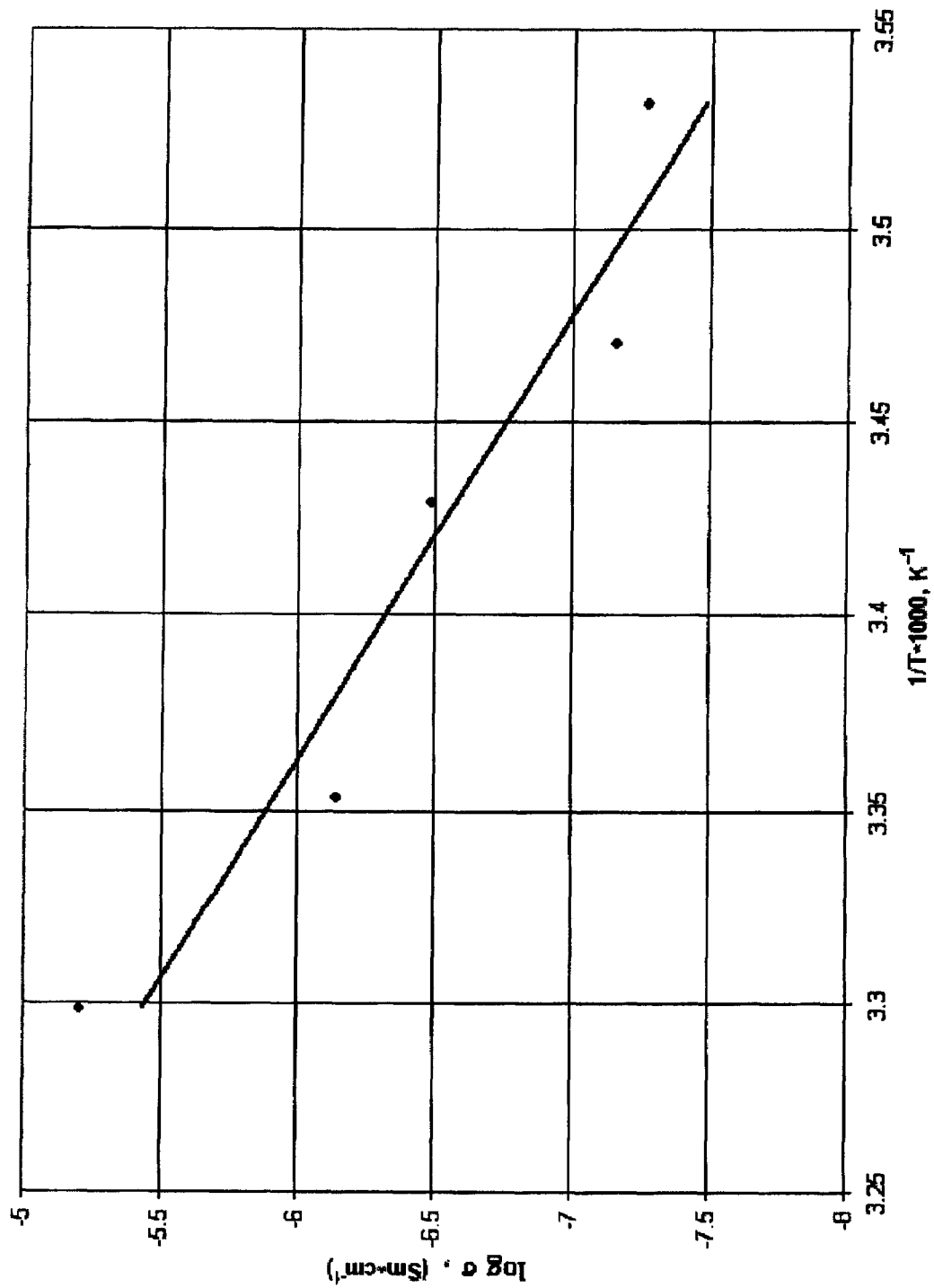
FIG. 6 is a graph showing a dependence of $log(\sigma)$ vs. $1/T$ measured for $Li_4Ti_5O_{11.985}$ of the present invention, synthesized according to Example 2 in Table 1 and measured by the 4-probe method.

Electronic conductivity of the Examples is measured on 20 mm diameter, 2-3 mm thick pellets that have been pressed and tempered inside powder samples under synthesis conditions until an equilibrium state is reached. Measurements are made by the 4-probe method on direct current, under potential of 90 volts. Attempts to receive reliable data for $Li_4Ti_5O_{12}$ samples (Table 2, Comp. Examples 1 and 2) are unsatisfactory, as the conductivity of these samples lies very close to a low limit of measurement for this method. Therefore, only order of conductivity is determinate. Results of measurements for $Li_4Ti_5O_{11.985}$, synthesized according to Example 2 in Table 1, in a narrow temperature interval of about room temperature, are shown on FIG. 6. Main sources of measurement discrepancies are the nature of compacted powder samples with significant porosity, as well as proximity to grain boundaries and contact effects.

Figure 7:
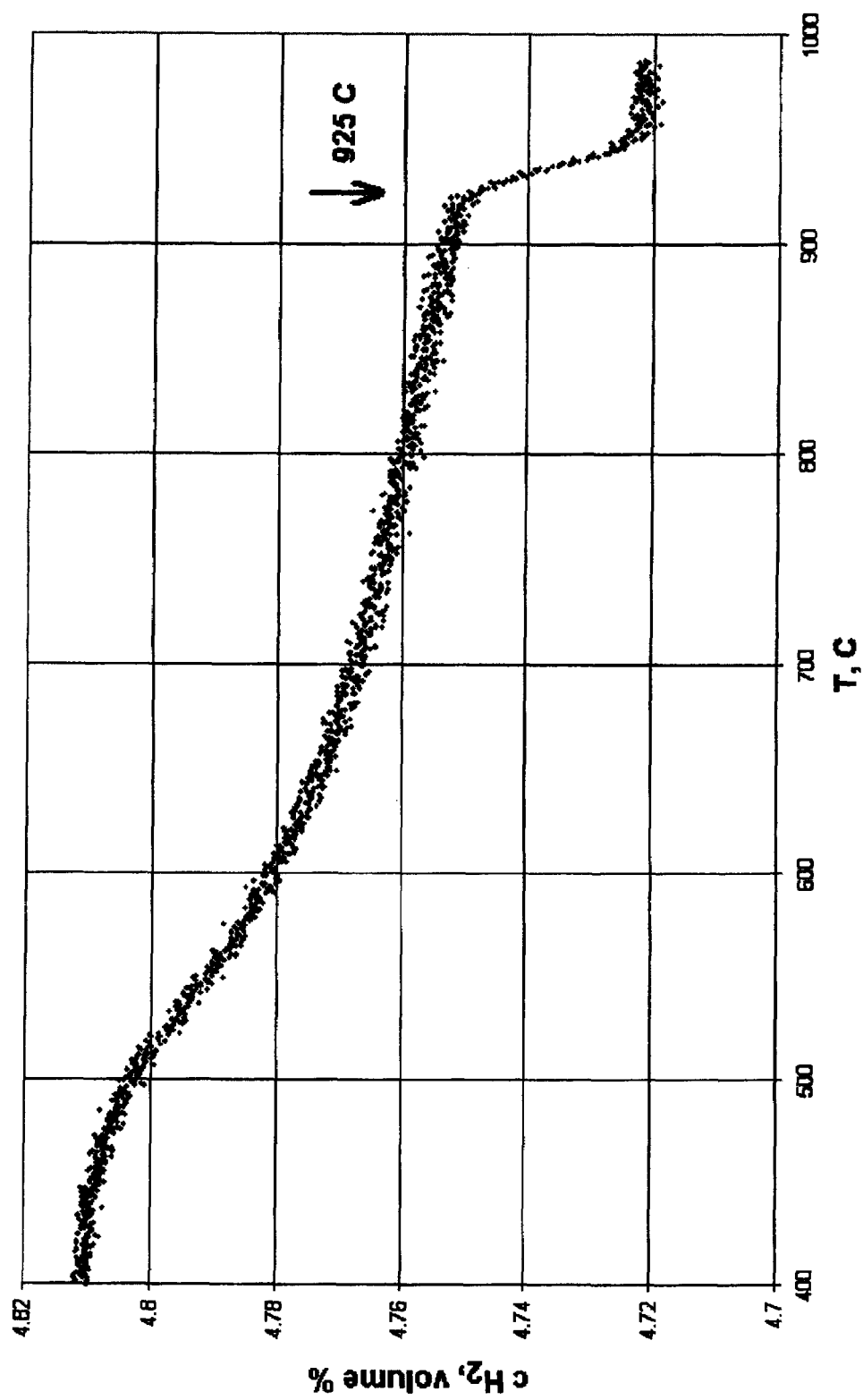
FIG. 7 is a kinetic curve of a sintering step whereby $Li_4Ti_5O_{12}$ is reduced by a $H_2$/Argon gas mixture (4.81 vol. % $H_2$), representing dependence of concentration of $H_2$ on temperature during heating with constant temperature increase of 2.5° C./min.
Figure 8:
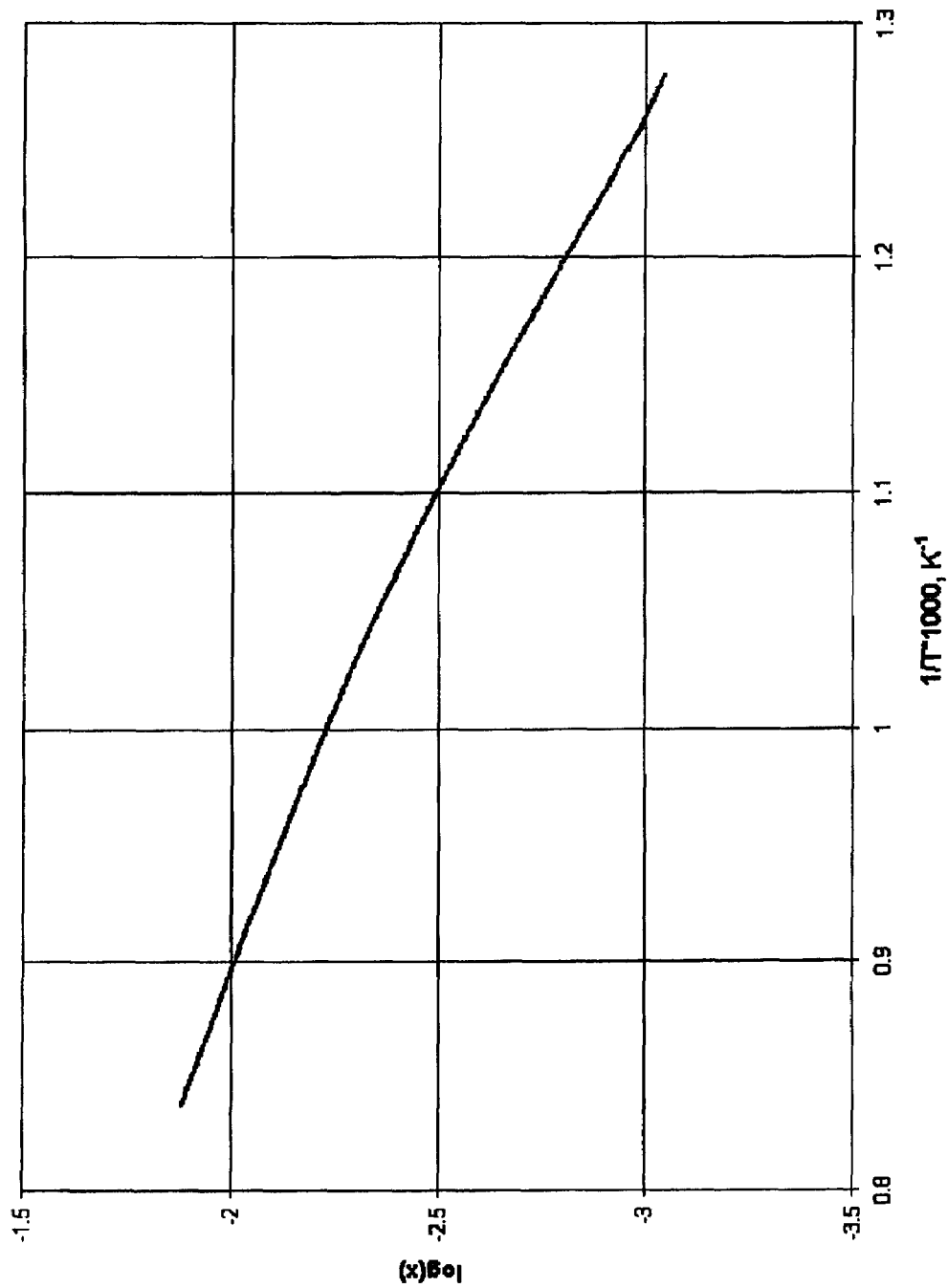
FIG. 8 is a kinetic curve of the sintering step of FIG. 7 in $log(x)$ vs. $1/T$ coordinates, wherein x is x in $Li_4Ti_5O_{12-x}$.

The kinetics of the sintering step for reducing the $Li_4Ti_5O_{12}$ is tested through the Temperature Controlled Reduction method. During linear heating of samples under gaseous atmosphere including the reducing agent, gas concentration is measured after flowing past the sample. Referring to FIG. 7, dependence of concentration of hydrogen, i.e., the reducing agent, against temperature of $Li_4Ti_5O_{12}$ is shown. A difference between initial concentration of hydrogen and concentration of hydrogen after the gaseous atmosphere flows past the sample gives an amount of hydrogen used for the sintering process. By integration of this curve, using values of sample mass and gas mixture flow, it is possible to calculate the value of x in the formula $Li_4Ti_5O_{12-x}$ as a function of temperature. The reduction during the sintering step becomes appreciable after 450° C. and proceeds smoothly until 925° C. FIG. 8 shows a dependence of the logarithm of x in formula $Li_4Ti_5O_{12-x}$ against reverse absolute temperature (in Kelvin). This curve has an Arrhenius-like character and is close to linear in the temperature interval 500° C.<T<925° C.

Figure 9:
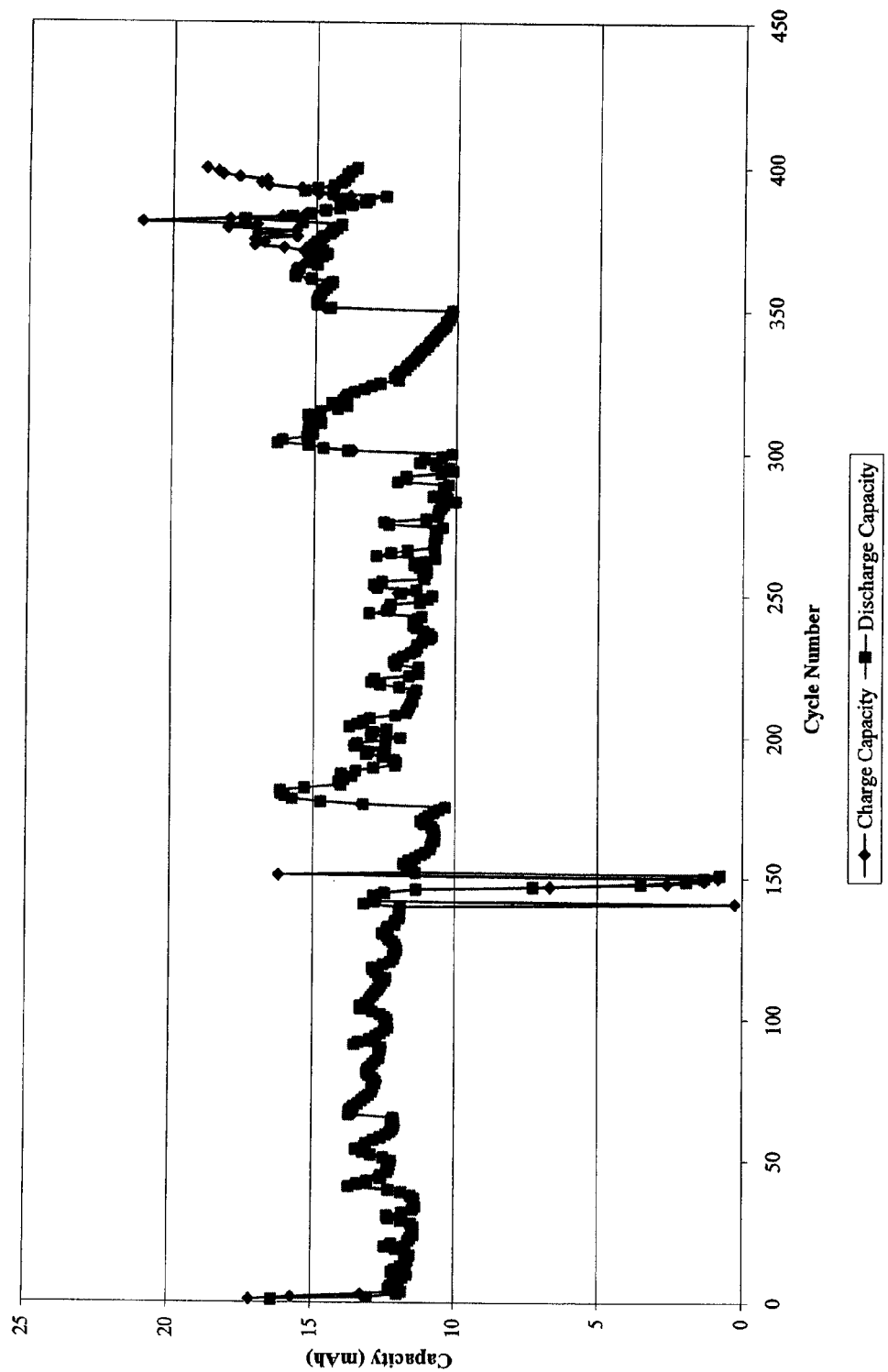
FIG. 9 is a graph showing a dependence of electric power generating capacity (mAh) vs. a number of cycles for a cell including an electrode with $Li_4Ti_5O_{12-x}$ of the present invention wherein a counter electrode is lithium metal.
Figure 10:
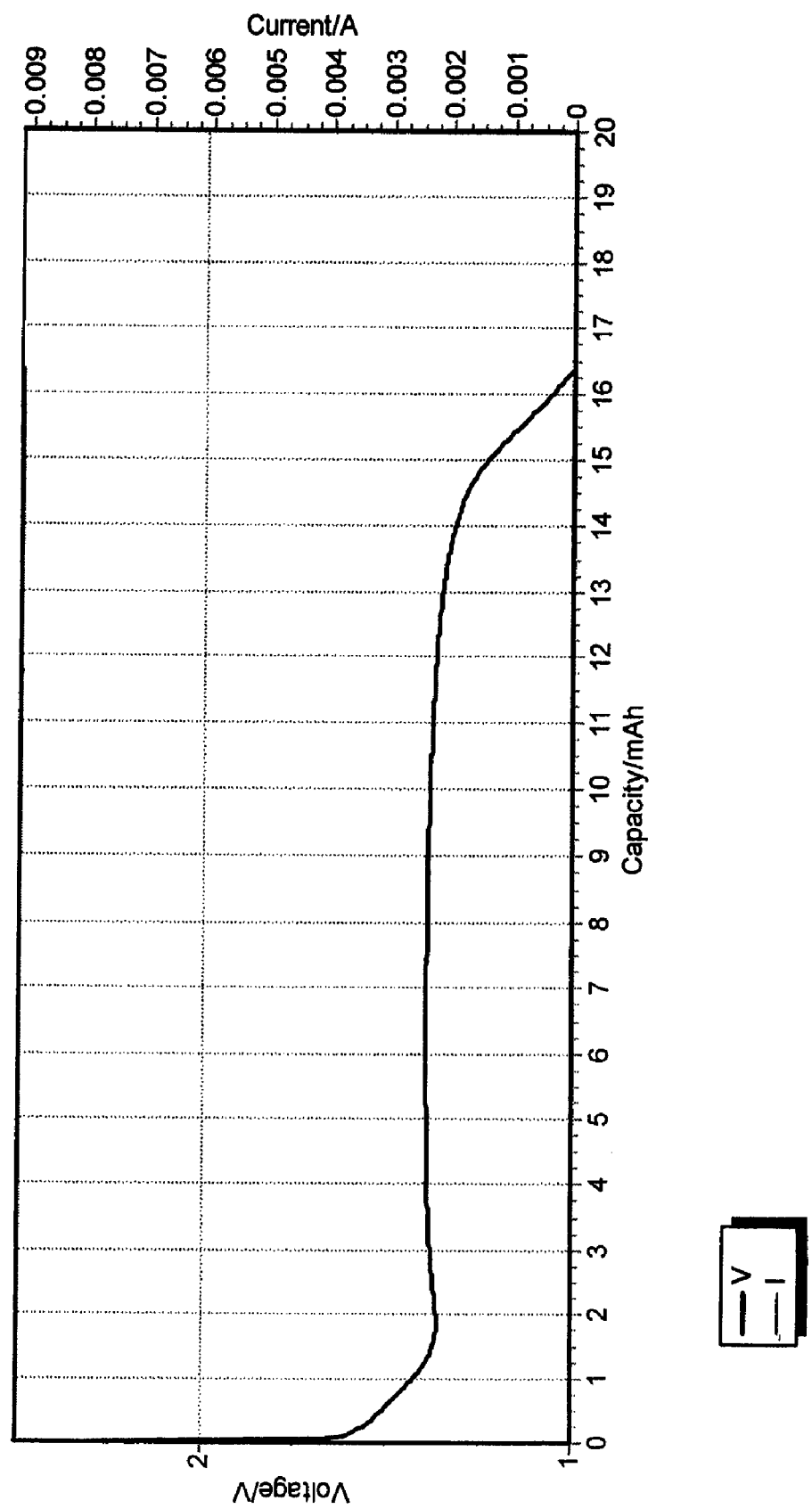
FIG. 10 is a graph showing a first discharge of a cell including an electrode with $Li_4Ti_5O_{12-x}$ of the present invention wherein a counter electrode is lithium metal.
Figure 11:
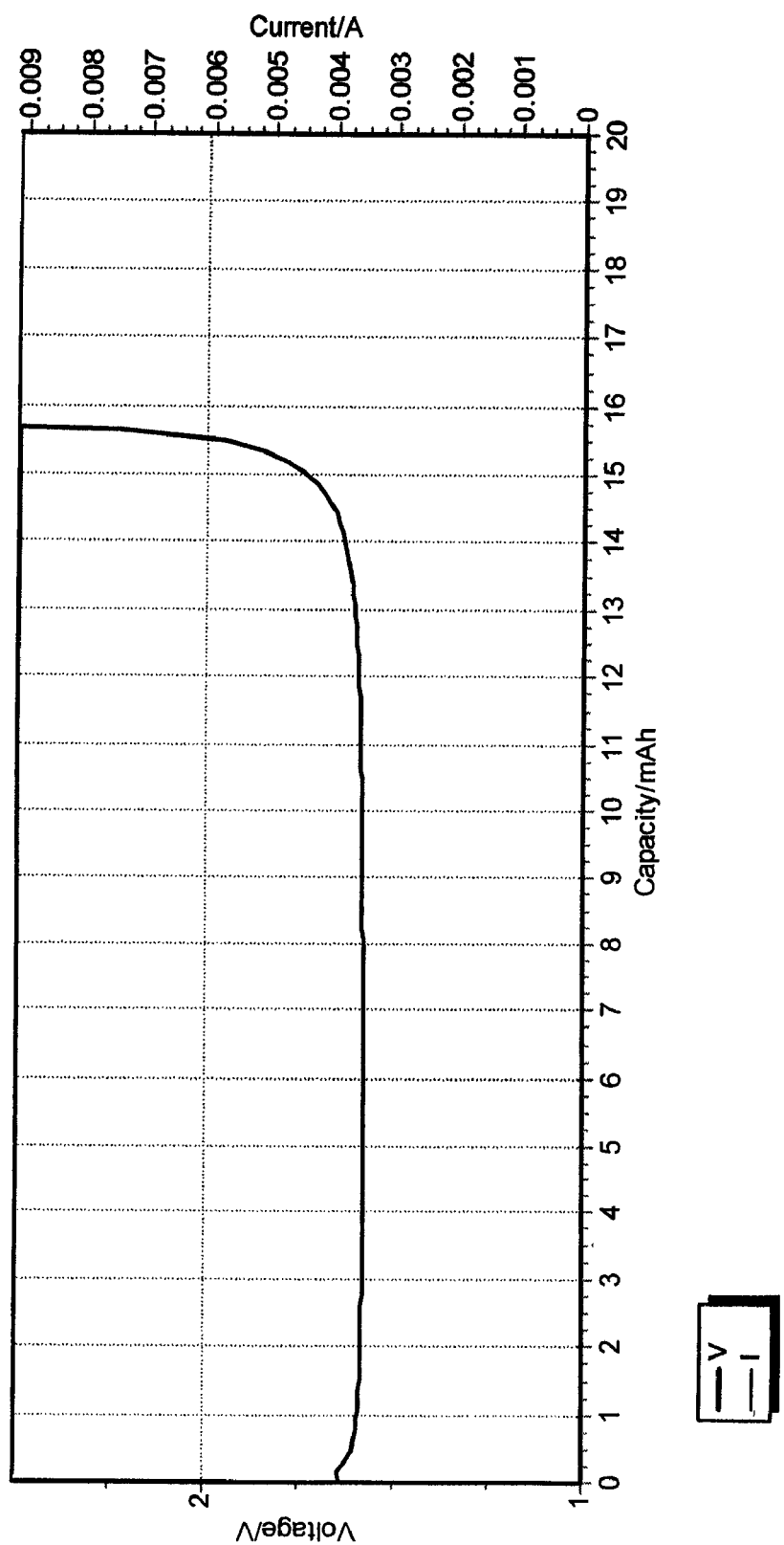
FIG. 11 is a graph showing a second charge of the cell including the electrode with $Li_4Ti_5O_{12-x}$ of the present invention wherein the counter electrode is lithium metal.
Figure 12:
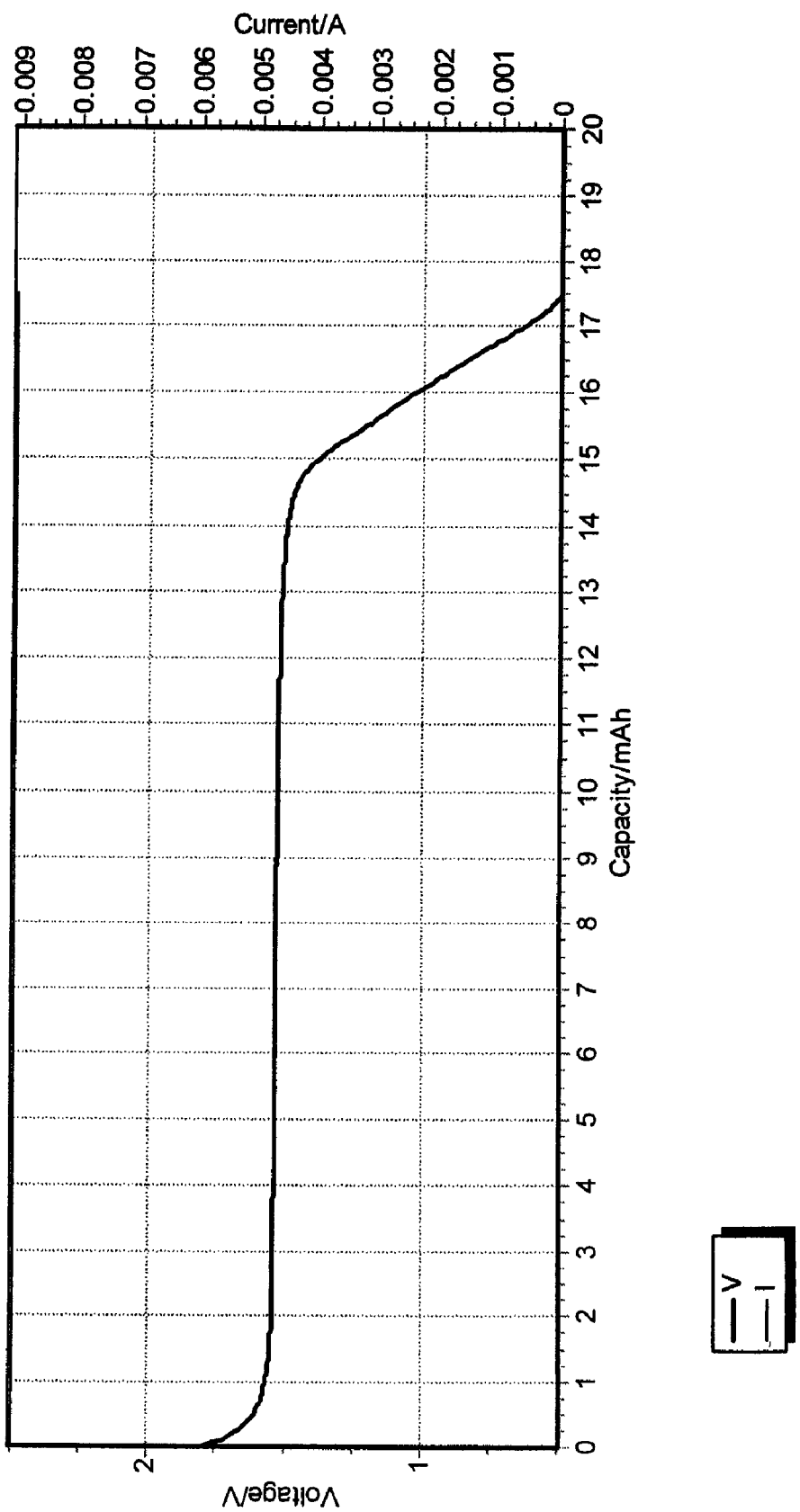
FIG. 12 is a graph showing a $382^{nd}$ discharge of the cell including the electrode with $Li_4Ti_5O_{12-x}$ of the present invention wherein the counter electrode is lithium metal.
Figure 13:
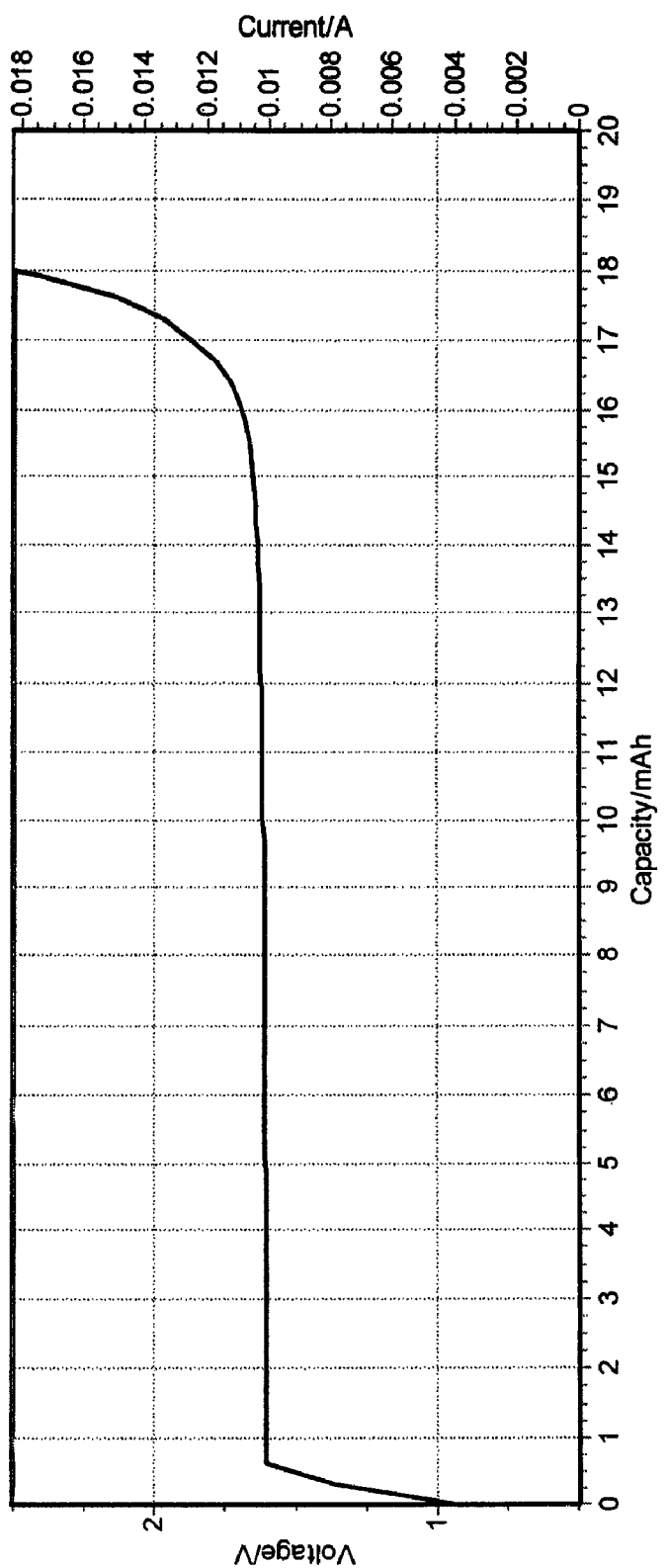
FIG. 13 is a graph showing a $382^{nd}$ charge of the cell including the electrode with $Li_4Ti_5O_{12-x}$ of the present invention wherein the counter electrode is lithium metal.

FIG. 9 shows that the lithium-based cell that includes the $Li_4Ti_5O_{12-x}$ maintains electric power generating capacity after many cycles, and FIGS. 10-13 illustrate flat charge and discharge curves of the $Li_4Ti_5O_{12-x}$, even after many cycles of charge and discharge.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A lithium titanate having the following formula:

$$Li_4Ti_5O_{12-x}$$

wherein x is greater than 0.

2. A lithium titanate as set forth in claim 1 wherein x is less than 0.02.

3. A lithium titanate as set forth in claim 1 wherein an average valence of titanium in said lithium titanate is less than 4.

4. A method of forming a lithium titanate having the following formula:

$$Li_4Ti_5O_{12-x}$$

wherein x is greater than 0, said method comprising the steps of:
providing a mixture of titanium dioxide and a lithium-based component; and
sintering the mixture in a gaseous atmosphere comprising a reducing agent to form the lithium titanate.

5. A method as set forth in claim 4 wherein the lithium-based component is selected from the group of lithium carbonate, lithium hydroxide, lithium oxide, and combinations thereof.

6. A method as set forth in claim 4 wherein the reducing agent is selected from the group of hydrogen, a hydrocarbon, carbon monoxide, and combinations thereof.

7. A method as set forth in claim 4 wherein the reducing agent is present in the gaseous atmosphere in a concentration of at least 0.1% by volume.

8. A method as set forth in claim 4 wherein the gaseous atmosphere further comprises another gas selected from the group of an inert gas, an inactive gas, and combinations thereof.

9. A method as set forth in claim 4 wherein the mixture is sintered at a temperature of at least 450° C.

10. A method as set forth in claim 9 wherein the mixture is sintered for a period of at least 30 minutes.

11. A lithium-based cell comprising:
an electrolyte;
an anode; and
a cathode;
wherein at least one of said anode and said cathode comprises lithium titanate having the following formula:

$$Li_4Ti_5O_{12-x}$$

wherein x is greater than 0.

12. A lithium-based cell as set forth in claim 11 wherein x is less than 0.02.

13. A lithium-based cell as set forth in claim 11 further defined as a lithium cell.

14. A lithium-based cell as set forth in claim 13 wherein said cathode comprises said lithium titanate.

15. A lithium-based cell as set forth in claim 14 wherein said lithium titanate is present in said cathode in an amount of at least 80 parts by weight based on the total weight of said cathode.

16. A lithium-based cell as set forth in claim 11 further defined as one of a lithium ion cell and a lithium polymer cell.

17. A lithium-based cell as set forth in claim 16 wherein said anode comprises said lithium titanate.

18. A lithium-based cell as set forth in claim 17 wherein said lithium titanate is present in said anode in an amount of at least 80 parts by weight based on the total weight of said anode.

19. A rechargeable battery including said lithium-based cell as set forth in claim 11.

20. A rechargeable battery as set forth in claim 19 further comprising a battery management system.

21. A vehicle including said rechargeable battery as set forth in claim 20.

* * * * *